Figure 2:
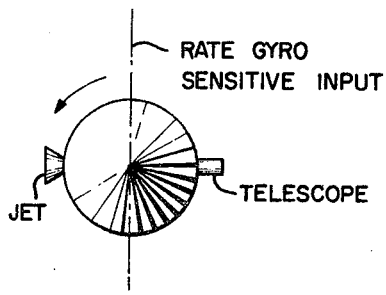

Jan. 23, 1968   J. A. WOLFE   3,365,147
CONTROL APPARATUS FOR STEERABLE CRAFT
Filed April 12, 1965   3 Sheets-Sheet 1

INVENTOR.
JOHN A. WOLFE
BY
ATTORNEY

INVENTOR.
JOHN A. WOLFE
BY Gordon Reed
ATTORNEY

Jan. 23, 1968   J. A. WOLFE   3,365,147
CONTROL APPARATUS FOR STEERABLE CRAFT
Filed April 12, 1965   3 Sheets-Sheet 3

INVENTOR.
JOHN A. WOLFE
BY
ATTORNEY

United States Patent Office 3,365,147
Patented Jan. 23, 1968

3,365,147
CONTROL APPARATUS FOR STEERABLE CRAFT
John A. Wolfe, St. Paul, Minn., assignor to Honeywell Inc., Minneapolis, Minn., a corporation of Delaware
Filed Apr. 12, 1965, Ser. No. 447,352
11 Claims. (Cl. 244—1)

This invention pertains to attitude control systems for dirigible craft such as space vehicles and more particularly pertains to an attitude control system for a spinning space vehicle.

An attitude control system for a spinning vehicle has been heretofore disclosed in a National Aeronautics and Space Administration Technical Note D-1922 titled "Flight Test of a Pitch Control for a Spinning Vehicle" by H. D. Garner and H. J. E. Reid, Jr., July 1963, also identified as NASA TN D-1922. In the present arrangement, the attitude control system maintains a desired relationship between the direction of the spin axis of the vehicle and a datum, such as maintaining the vehicle spin axis vertical to the earth's surface. Thus the direction of the spin axis may be aligned with an earth radial.

The attitude control subsystem comprises a horizon sighting telescope, which is radially mounted on the vehicle and depressed 24° roughly from the horizontal toward the spin axis, and it is oriented in such a manner that the horizon line of the earth is perpendicular to a rectangular viewing aperture. The horizon from the upper end traverses toward the lower end the sides of the aperture of the telescope field of view because of the change in the direction of the line of sight to the horizon as the vehicle ascends from launch point toward apogee. The sides of the aperture are about 16° in length.

This telescope in combination with suitable means such as a bolometer provides a fluctuating signal when the craft spin axis is tilted off the vertical. Included in the system also is a rate gyroscope which is mounted on the vehicle so as to sense the rate of tilt of the spin axis from the vertical to the earth's surface for example. Additionally the subsystem includes control electronics and a reaction jet assembly. The jet is mounted below the center of gravity of the vehicle and is in the same plane that is formed by the vehicle spin axis and the line of sight of the telescope. The rate gyro sensitive axis is at right angles to this plane and thus senses rate of tilt of the telescope and thus the rate of tilt of the spin axis. The signals originating in the horizon telescope and the rate gyro are combined and applied to the control electronics and thence to the reaction jet.

In the particular vehicle considered, that is a spinning vehicle, the impulse from the reaction jet should occur at the proper time during the spinning motion of the vehicle in order to provide proper direction of attitude correction. The subsystem is tolerable to a small phase shift between the time when the impulse should be provided and when it is actually provided. For example, the subsystem may be tolerable to a 10° phase shift.

On a clear day with the atmospheric effects negligible, upon tilt of the spin axis away from the vertical, the telescope which scans the horizon will "see" during the rotation of the vehicle both the sky and the earth's surface to develop a control signal.

When the atmosphere is not clear the output signal from the telescope is affected by cloud cover and other atmospheric effects. To avoid such effects, a low pass filter restricting the frequency band pass to a desired number of cycles per second filters the telescope signal. However using a low pass filter introduces systems lags involving the firing of the jet so that the firing of the single jet does not occur at the proper time to cause return of the vehicle to the vertical.

The vehicle as stated can tolerate a 10° phase lag in such firing of the jet. However, the actual spin rate of the vehicle while in its flight path cannot be predicted, in many instances, closer than .5 to 1.0 revolutions per second. The vehicle spin rate is related to the frequency design of the lag device or low pass filter above. However if the filter be designed on the basis of 0.5 revolutions per second to provide the tolerable phase shift, but the spin rate be actually 1.0 revolutions per second, the phase shift through the filter will increase with the increase in frequency and thus tend to exceed the phase shift that can be tolerated.

An object of this invention is to provide apparatus for adjusting the parameters of the filter to maintain substantially constant the phase shift of the output of the filter relative to the input for changes in frequency of the input thereto.

A further object of this invention is to adjust the parameters of a low band pass filter by novel means to prevent changes in phase angle of the output thereof in response to changes in frequency of the signal applied thereto.

A further object of the invention is to adjust the parameters of the low pass filter as a function of the spin rate of the vehicle.

A further object of the invention is to vary a parameter of the filter in accordance with the output of the horizon scanner.

A further object of this invention is to vary a parameter of the filter by means of a memory device controlled from the horizon scanner.

Other aims and objects and advantages of the invention will appear from a consideration of the description and the accompanying drawings showing for illustrative purposes and embodiment of this invention applied to a spinning vehicle. It is to be understood however that the description is not to be taken in a limiting sense and the scope of this invention is defined in the appended claims.

Figure 1:
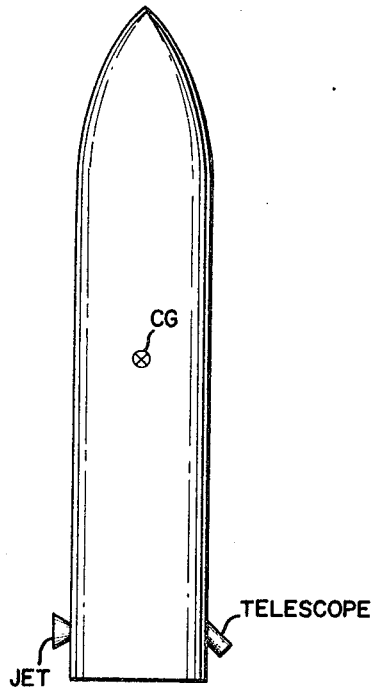
Figure 3:
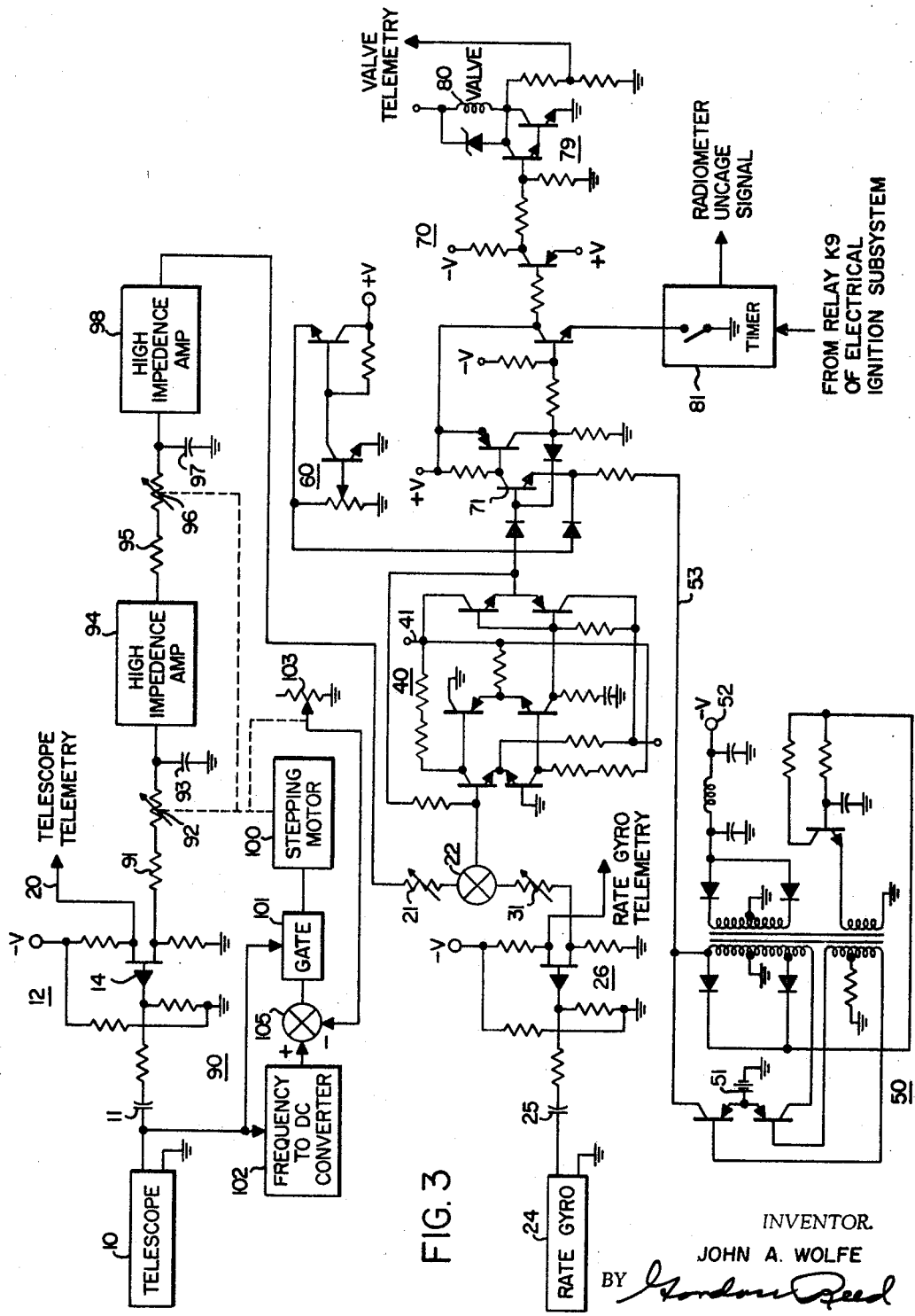
Figure 4A:
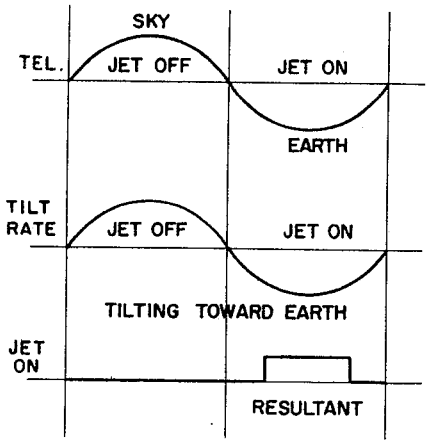
Figure 4B:
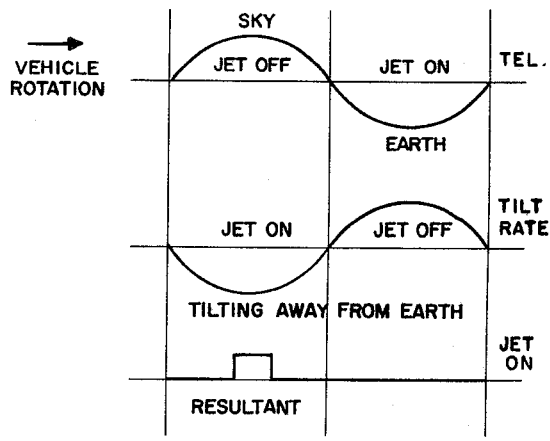
Figure 5:
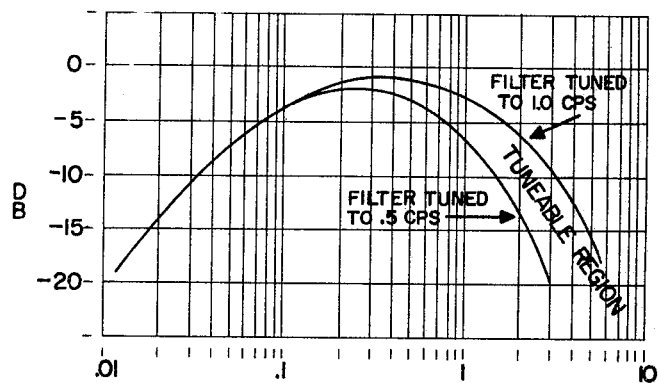
Figure 6:
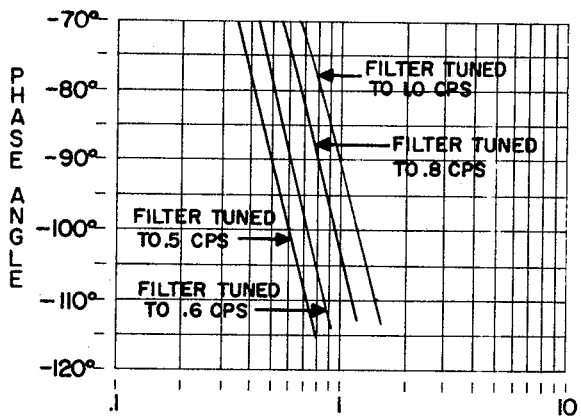

Referring to the drawings:
FIGURE 1 is a side view of the space vehicle showing the single reaction jet with respect to the longitudinal position of the center of gravity of the vehicle;
FIGURE 2 is a top view of the vehicle showing that the positions of the reaction jet and the horizon telescope are arranged in the same plane formed by the spin axis of the vehicle and the plane of the telescope, along with the rate gyro sensitive axis at right angles to this plane;
FIGURE 3 is an electrical schematic of the attitude control subsystem for the vehicle;
FIGURE 4A is a diagram of the approximate phase relationship of the signals from the telescope and rate gyro along with the firing of the jet causing erection to the vertical, as the vehicle's longitudinal axis tilts away from the vertical while it spins;
FIGURE 4B is a diagram of the approximate phase relationship of the signals from the telescope and rate gyro along with the different firing of the jet as the vehicle's longitudinal axis is returning to the vertical;
FIGURE 5 is a graph showing filter outputs magnitudes in decibels vs. frequency of input to the filter; and
FIGURE 6 is a graph showing filter output phase shift vs. frequency of input to the filter.

According to the invention, in this type of vehicle during rotation about its longitudinal axis, between approximately .5 to 1.0 revolution per second, a horizon scanner on the vehicle provides a signal that is used to control the attitude of the vehicle to oppose tilt from the vertical. A filter is required on the horizon scanner signal to remove so called noise from the scanner signal, such as that due to cloud effects. This delays the application of the scanner signal for control purposes. A phase angle between the output signal from the filter and the telescope signal to the filter while the vehicle spins must be predictable and would be no problem if the true spin rate were known. But the spin rate of the vehicle is only predictable to within .5 to 1 cycle per second, for example. The phase angle of most filters would vary more than the presently allowable 10° phase shift over the .5 to 1.0 cycles per second frequency range which is one octave.

In the subject arrangement, the basic telescope scanner frequency or vehicle spin rate is an indication of where the filter should be tuned. Consequently, the filter parameter or tuning adjustment is based on the basic scanner signal frequency. If we consider, where T is the time constant and S the Laplace operator, a first order lag, $$\frac{1}{1+TS}$$

as a filter the phase angle at the break frequency on such logarithim plots of such a filter changes at the rate of 20° per octave or 20° as the frequency is halved or doubled. To meet a maximum allowable 10° phase shift requirements for double the spin rate from .5 to 1.0 c.p.s. requires an adjustment of filter parameters. The filter parameter varied by frequency for a first order lag need only be 50% accurate. For a second order filter, 25% parameter accuracy would be required.

The parameters of capacitor-resistor filter which would be varied would be resistive and this variation may be done by mechanical or electronic means. This mechanical or electronic means may be provided with information for setting the frequency of the filter at any time a signal is present in the output of the horizon scanner. If the mechanical or electronic means included a memory device such as stepping motor in a follow up system controlled by the scanner signal, correct filter parameters could be held for the existing vehicle spin rate even if the sensor signal disappeared when the vehicle was ideally oriented.

Reference is made, for background purposes, to the invention in FIGURE 3 conjointly with a description of the over-all vehicle attitude control system. Since the present system differs from the prior system in the Technical Note NASA TN D-1922 above as to the position of a single horizon sensor a brief description of the overall control system herein appears desirable. In FIGURE 3, a horizon telescope 10 in practice is radially mounted on the vehicle and depressed 24° from the horizontal toward the spin axis. It is oriented as stated in such a manner that the horizon is perpendicular to and traverses the 16° side or aperture of the telescope field of view as the vehicle after launch ascends toward apogee. In connection with the telescope there is used an arrangement for obtaining signals from the telescope. For example a device of this type may be a thermistor bolometer upon which the radiation through the telescope is focused. The resultant signal is then applied through a capacitor coupling 11 to an amplifier 12 and is amplified therein to such a level that it can be accepted for example by the telescope telemetry, not shown, by means of conductor 20. The amplifier signal from amplifier 12 is also fed through a resistor 21 to a summing device 22 where it is summed with a signal originating within a rate gyro 24. For this purpose the output of rate gyro 24 is supplied through a coupling capacitor 25, amplifier 26, resistor 31, to summing device 22. The rate gyro is mounted on the vehicle to sense the tilt rate of the spin axis of the vehicle as shown in FIGURE 1 and may have its output axis somewhat parallel to the vehicle spin axis. The rate gyro provides a DC output to the capacitor 25. For sensing the vehicle spin axis tilt rate, the rate gyro is mounted on the vehicle spin axis and its sensitive or input axis is oriented so as to be 90° from the plane of the spin axis and the gyroscope rotor spin axis.

Thus each DC signal originating in the horizon telescope 10 and the rate gyro 24 is combined in the resistance summer 22. This combined or resultant signal then enters a differential DC amplifier 40. By making both positive and negative voltages available, the differential DC amplifier is operated relative to ground, and signal level drifts corresponding to an attitude error greater than 0.1° due to time and temperature changes are eliminated. The positive voltage for the DC amplifier is obtained from the normal battery supply connection 41. The negative voltage is obtained from a typical DC to DC converter 50 operated at about 10 kc. This voltage, which is well filtered, is also supplied to the three amplifiers at a terminal 52 as a negative bias voltage.

The output of the differential DC amplifier 40 is fed into a clamp 60. The output of this clamp 60 can be adjusted to be independent of the input amplitude. The clamp output is used to drive a low hysteresis switch 70. This switch 70 is a modified Schmitt trigger circuit. Since a 10 kc. signal is available from the converter circuit 50 over conductor 53, it is applied to the emitter of the switch input transistor 71 with a result that the switch operates at a 10 kc. sampler. Since the output of switch 70 drives an inductive load (solenoid valve 80) the total effect is a typical Schmitt trigger operating with an extremely low hysteresis level. The triggering of the solenoid valve for a reaction jet to provide thrust to the vehicle generates a pulse suitable also for telemetering and subsequent ground monitoring of the valve action.

Conveniently a timer 81 is provided to supply timing information so that an interval is provided wherein the jet for torquing the vehicle may be energized and another interval is provided during which other matters may be accomplished such as obtaining flight data.

Thus far in the attitude control system no provision has been made for compensating the attitude control system for the effects due to clouds or other atmospheric conditions on the output signal from telescope 10. In connection with the following description of one form of compensating arrangement, reference may be made to FIGURE 3. The compensation arrangement in FIGURE 3, identified by the reference character 90 generally, may also be referred to as a tuneable filter. As shown in the upper left in FIGURE 3, the signal from the telescope or horizon scanner 10 is supplied through the low frequency blocking capacitor 11 to amplifier 12 having the field effect transistor 14 therein. The transfer function from the amplifier 12 including the capacitor 11 and as shown provides a high pass effect for the input signal. In other words for steady state DC signals from the scanner, no signal is transmitted to the amplifier 12.

The output from amplifier 12 is transmitted by resistor 91, variable resistor 92 forming with capacitor 93 a lag network, to high impedance amplifier 94. The output of amplifier 94 is transmitted through resistor 95, and a variable resistor 96 which with capacitor 97 comprises a lag network, to high impedance amplifier 98. The output of amplifier 98 is supplied to resistor 21 of FIGURE 3 extending to the summer 22. The variable resistors 92, 96 may be adjusted from a memory device such as stepping motor 100 to vary the parameters of two lag networks one comprising resistor 92 and capacitor 93 the other comprising resistor 96 and capacitor 97. Stepping motor 100 is controlled through a gate 101 by a frequency to DC converter 102 which receives the scanner signal as an input thereto and supplies an output in proportion to the frequency of the input. Gate 101 functions to open the circuit between converter 102 and stepping motor 100 if an AC component in the scanner signal is absent. In other words for steady or DC scanner signals, the gate 101 will open. The stepping motor control is of the rebalancing type, and motor 100 operates a feedback in the form of a potentiometer 103 connected to a summing device 105. Device 105 is for both the feedback signal and the output of converter 102. It will be appreciated that when the scanner signal frequency varies in the present instance from 0.5 revolutions or cycles per second to 1.0 revolutions per second that potentiometer 103 and resistors 92, 96 are correspondingly varied to maintain constant the phase shift of the filter output relative to the input.

*Scanner signal*

While the vehicle when launched, due to exterior fins, will be caused to rotate about its spin axis, assume for the moment it is launched in a vertical direction but that it is not spinning about its longitudinal axis. It will be evident that the horizon line as seen by the telescope and through its somewhat vertically arranged aperture will appear at launch near the top of the aperture. As the vehicle following launching increases its altitude, the horizon as seen through the aperture tends to move downward toward the bottom of the aperture.

If the vehicle at high altitude be tilted toward the horizon on the side having the scanner, the horizon tends to move upwardly in the telescope aperture, whereas if the side of the vehicle under consideration is tilted skyward, the horizon will appear to move downwardly in the telescope aperture.

Assume now that the aircraft is spinning about its longitudinal axis. As long as the longitudinal axis is perpendicular to the earth, the telescope will see the horizon during its entire revolution about its spin axis and a constant or steady DC signal output is provided by the scanner. This signal in the embodiment of FIGURE 3 is blocked by capacitor 11 from passage to amplifier 12. However, if the vehicle be tilted so that its longitudinal or spin axis is away from the perpendicular to the earth, then during part of the rotation about its spin axis the horizon will appear to move upwardly in the aperture and during part of the rotation of the vehicle it will appear to move downwardly. This upward and downward movement results in the development of a fluctuating or alternating electrical signal.

Referring to FIGURE 4A, if the aircraft's longitudinal axis be tilted off the vertical to the earth while the craft is rotating about its spin axis, the telescope will "see" the sky during a portion of its rotation with the craft about its longitudinal axis and will "see" the earth during the other part of its rotation. The control system of FIGURE 3 is such that the single reaction jet thereof is energized only during the portion of the rotation when the telescope "sees" the earth and not when it "sees" the sky.

With respect to the rate gyroscope, this gyroscope may be mounted with its output axis in the direction of the vehicle longitudinal spin axis and with its sensitive or input axis at right angles to the plane containing the gyroscope rotor spin axis and the spin axis of the telescope. The arrangement is such that while a rate signal is ordinarily 90° ahead of a displacement signal yet because of the orientation of the rate gyroscope in the vehicle, when the vehicle tilts off the perpendicular to the earth, the telescope signal and the rate signal are in phase as shown in FIGURE 4A.

It will be appreciated that after the vehicle has tilted off the vertical to the maximum amount and is returning to the vertical, due to the reaction jet thrust, that the rate signal will be of opposite phase to the decreasing telescope signal as illustrated in FIGURE 4B. In other words even though the telescope be directed skyward, the rate signal will be of such polarity or phase and magnitude as to call for a turn on the reaction jet to provide a thrust in the opposite direction from that initially provided by the jet, to check vehicle angular rate opposing overshoot of the vehicle.

While in the present instance the vehicle has been considered as having a low spinning rate and because of such low spinning rate it has no appreciable precession action resulting from the reaction jet thrust, yet it will be appreciated that if the vehicle has a higher spinning rate that a thrust from the reaction jet could cause precession of the vehicle in a plane at right angles to the direction of the applied thrust. In such situation, the reaction jet may have a different angular displacement relative to the telescope than as shown in FIGURE 2 thus the telescope could be 90° from the direction of the thrust vector.

Returning to the tuneable band pass filter 90 and reviewing the same with reference to FIGURE 5, it will be understood that there will be a phase shift between the output relative to the input. This phase shift normally increases with an increase in frequency, due to vehicle spin rate increase, for a filter having no adjustment means for its parameters. Thus the magnitude of output vs. input changes. In the graph of FIGURE 6 there is shown a series of curves relating the phase angle in degrees of the output relative to the input for a filter at various frequencies. For example in FIGURE 6 with respect to the graph where the filter is tuned to .5 c.p.s. of the spin rate of the vehicle it is roughly —90° phase shift which implies that the reaction jet is fired at roughly the halfway point of the portion of the rotation when the scanner sees the earth. This position of firing is nearly ideal for a spinning vehicle that develops no appreciable precessional or gyroscopic torques.

For increased frequencies of 1.0 cycles per second corresponding with the vehicle spin rate and with no adjustment of the filter parameter, the phase shift at this frequency from FIGURE 6 for a filter tuned to .5 c.p.s. is greater than —120°. However if the filter be returned to 1.0 cycles per second we still have merely approximately —90° change in phase angle between the input and output which corresponds to that for .5 c.p.s. despite differences in vehicle spin rates between 0.5 and 1.0 c.p.s. This is well within the 10° variation or tolerance allowed for changes in spin rate from 0.5 to 1.0 revolutions per second.

FIGURE 5 also shows the advantage of the tuneable filter, as mathematically expressed therein, with the lower curve showing the filter tuned for 0.5 cycles per second operation and the upper curve wherein the filter is tuned for 1.0 cycles per second operation. The length of the ordinate on the lower curve for the .5 cycles per second operation corresponds substantially to the ordinate for the 1.0 cycles per second operation of the upper curve. In other words despite changes in frequency of the input signal the phase shift for the output signal of the filter remains substantially constant over the frequency range involved. By this arrangement, the operation of the reaction jet occurs at the desired moment during the rotation of the spinning vehicle to provide proper reaction thrust for attitude control.

It will now be apparent from above that I have provided for a vehicle, an improved attitude control system using a sight for sensing departures in attitude of the vehicle and that such system is provided with a filter for blocking extraneous effects from the control imposed by the sighting device, on the attitude control system and that such filter has its parameters automatically adjusted in accordance with angular rate of change in position of the vehicle in a plane at an angle to the line of sight.

I claim:

1. In a vehicle rotatable about its spin axis while having a flight path relative to the earth, means for maintaining the spin axis of the vehicle in the direction of the earth's center comprising means sensing tilt of the craft about the vertical for developing a control signal, a low pass filter means receiving said signal and applying the output of the filter to attitude changing means of the vehicle, and means for adjusting said filter for changes in spin rate from a datum spin rate to oppose further phase shift of the filter output over its input.

2. The apparatus of claim 1 wherein the filter means is provided with automatic means controlled by the tilt sensing means that adjust a parameter thereof so that its gain or transfer function upon changes in frequency of the applied signal tends to maintain the output of the filter substantially constant despite changes in the frequency of the input signal.

3. In a vehicle rotatable about an axis while traversing a flight path in space relative to the earth and having attitude control means for automatically maintaining a desired relationship between the direction of the spin axis and the surface of the earth comprising: means for sensing change in radial direction of the spin axis relative to the earth's surface for developing an electrical signal; and filter means such as a first order log receiving said signal and having its output supplied to attitude changing means of the craft, said filter means including means for automatically compensating the gain or transfer function thereof in accordance with the changes in frequency of the applied signal.

4. In control apparatus for a spinning space vehicle having a horizon scanner signal for providing control signals to an attitude control means for the vehicle, said attitude control means including an amplifier receiving the control signals and supplying an output for attitude control purposes, a low pass filter means intermediate said horizon sensor and amplifier for filtering higher frequency harmonics due to anomalies in the atmospheric horizon; and further means for holding the phase shift of the output of the horizon scanner-amplifier combination to within a desired change for differences in the spin rate of the vehicle between the lower rate and a higher rate wherein changes in the spin rate affect the band width of the filter.

5. In control apparatus for a space vehicle having a rotating scanner sensor for providing control signals to an attitude control means for the vehicle for maintaining a desired relationship of the axis of rotation of the scanner relative to a dataum, said means including an amplifier receiving the control signals and supplying an output for vehicle attitude control purposes, filter means between the scanner sensor and the amplifier for filtering high frequency harmonics such as due to atmospheric conditions, and means for substantially holding the phase shift of the output of the filter relative to its input to within a predetermined angle during changes in the rotation rate of the scanner sensor from a low rate to a higher rate.

6. In a condition control system having a condition sensor providing a fundamental varying signal upon change in the condition, a filter receiving said signal and restricting passage of those signals affecting the sensor having a frequency other than those of a desired frequency, and means controlled by the sensor signal for opposing phase shift of the output of the filter relative to the input during changes in frequency of the desired signal.

7. In position control apparatus for a spinning vehicle said apparatus including a horizon scanner and scanner responsive means for maintaining a desired direction of the spin axis of the vehicle relative to a datum including means in the scanner providing a changing signal upon departure of the vehicle spin axis direction from datum, in combination: filter means in said apparatus receiving said changing signal and transmitting primarily the changing signal having a frequency comparable with the spin rate of the vehicle, and further means responsive to the changing signal and adjusting the filter for changes in frequency of the signal caused by changes in spin rate of the vehicle.

8. In an attitude control apparatus for a spinning member, neutrally mounted, for maintaining a desired direction of the spin axis of the member relative to a datum by operation of jet means, means providing a signal upon departure of the spin axis direction from datum, filter means in said apparatus receiving said signal and transmitting primarily the signal having a frequency comparable with the spin rate of the member, and means adjusting a parameter of the filter for changes in frequency of the signal caused by changes in spin rate of the member for holding the phase shift of the output of the filter to within a desired magnitude whereby operation of the reaction jet from the control apparatus causes proper precession of the spinning member.

9. In an attitude control apparatus for a spinning member which is in substantial neutral equilibrium, said apparatus including means for maintaining a desired direction of the spin axis of the member relative to a datum including means providing a changing signal upon departure of the spin axis direction from datum in combination: a resistor-capacitor filter means in said apparatus receiving said signal and transmitting primarily the changing signal having a frequency comparable with the spin rate of the member; and means responsive to the spin rate of the member adjusting a parameter of the filter for changes in frequency of the signal caused by changes in spin rate of the member.

10. In attitude control apparatus for a spin stabilized vehicle for maintaining a desired direction of the spin axis of the vehicle relative to a datum including means for causing precessing of said vehicle and sensor means providing a changing signal upon departure of the spin axis direction from datum in combination: filter means in said apparatus receiving said sensor signal and transmitting primarily the changing signal having a frequency comparable with the spin rate of the vehicle and means responsive to the vehicle spin rate adjusting the filter for changes in frequency of the signal caused by changes in spin rate of the vehicle.

11. In position apparatus for a spinning vehicle for maintaining a desired position of the spin axis of the vehicle relative to a datum including a body-fixed horizon detector for an attitude reference providing a signal upon departure of the spin axis from the relative position, in combination: filter means in said apparatus receiving said signal from said attitude reference and transmitting primarily the changing signal having a frequency comparable with the vehicle spin rate, and means opposing phase shift of the output of the filter relative to the input for changes in frequency of the signal caused by changes in spin rate of the vehicle.

References Cited

UNITED STATES PATENTS

| | | | |
|---|---|---|---|
| 1,794,932 | 3/1931 | Usselman | 329—139 X |
| 2,742,613 | 4/1956 | Sontheimer | 333—29 |
| 2,911,598 | 11/1959 | Clemensen | 333—29 |
| 3,180,587 | 4/1965 | Gardner et al. | 244—1 |
| 3,201,591 | 8/1965 | Froelich | 250—83.3 |

FOREIGN PATENTS 729,901  5/1955  Great Britain.

FERGUS S. MIDDLETON, *Primary Examiner.*